Dec. 25, 1956  T. H. JOHNSON ET AL  2,775,198
PLATE CLAMP
Filed Aug. 27, 1953  5 Sheets-Sheet 1
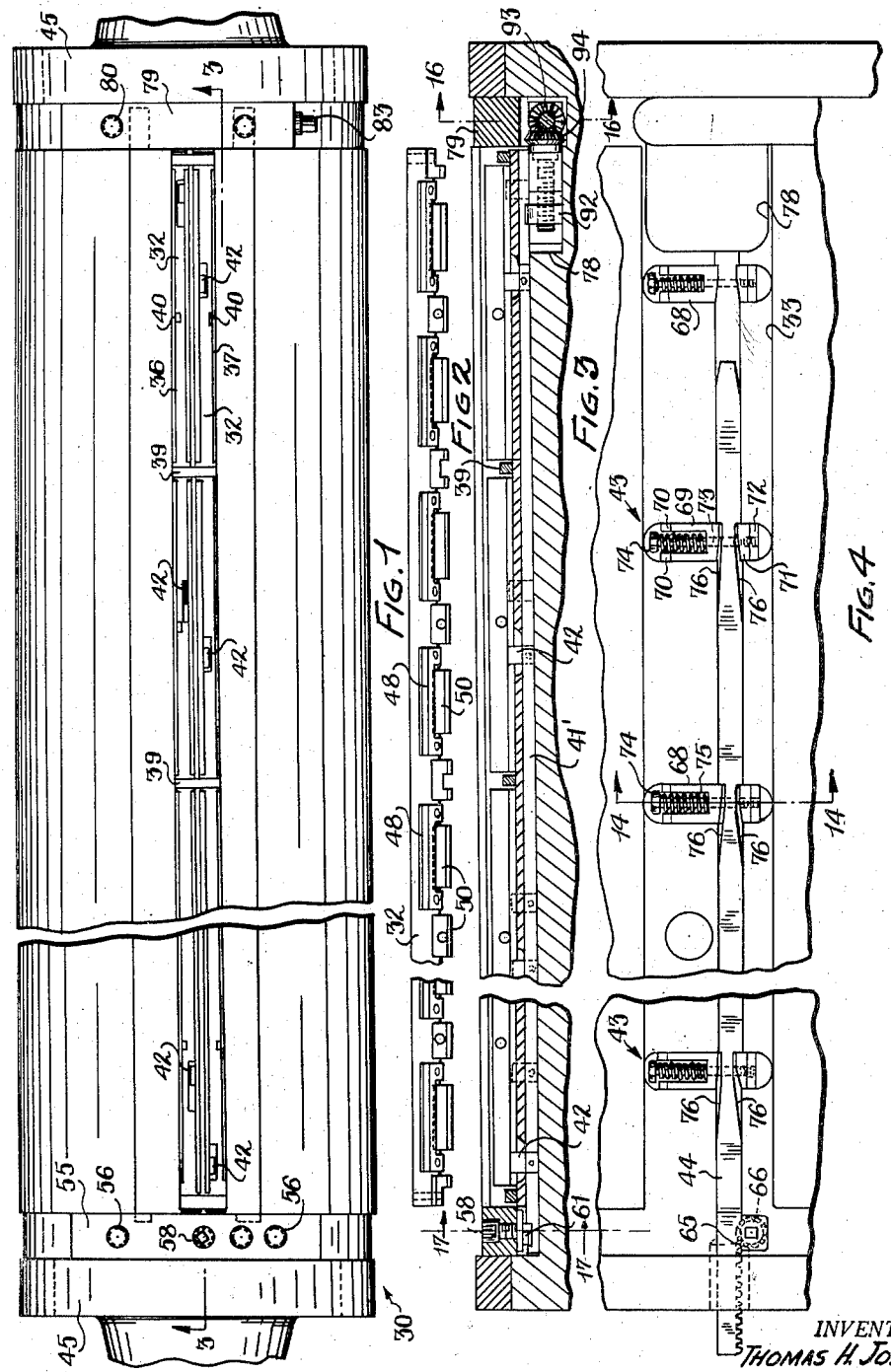
INVENTORS
THOMAS H. JOHNSON
BY ANTHONY J. MUELLER
Hudson, Boughton,
Williams, David & Hoffmann
ATTORNEYS Dec. 25, 1956  T. H. JOHNSON ET AL  2,775,198
PLATE CLAMP
Filed Aug. 27, 1953  5 Sheets-Sheet 2
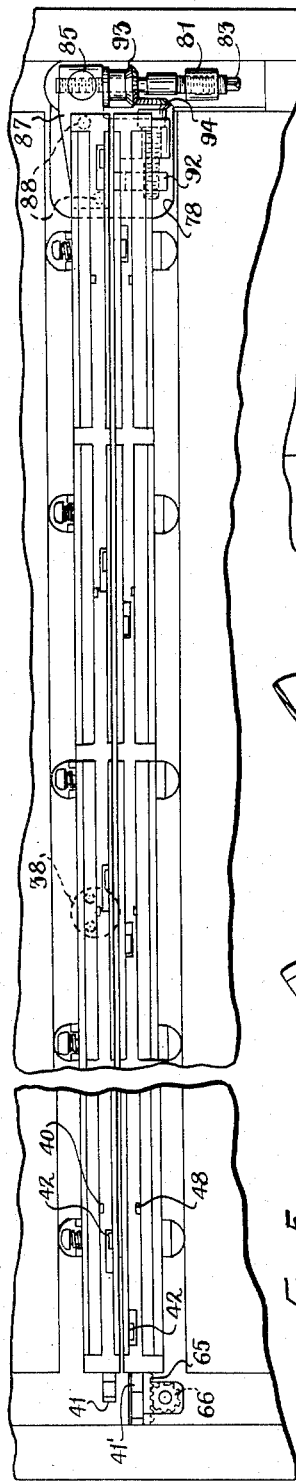
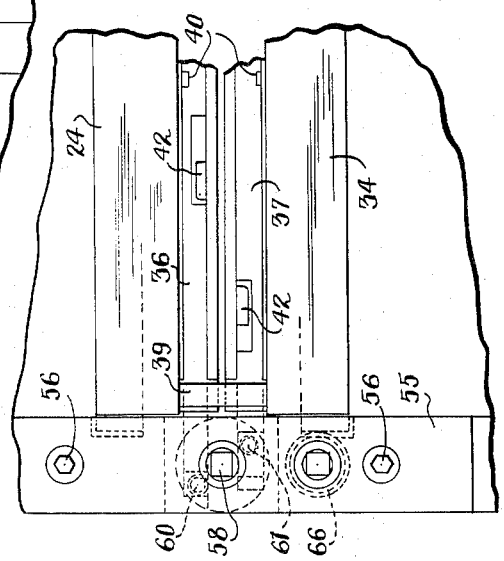
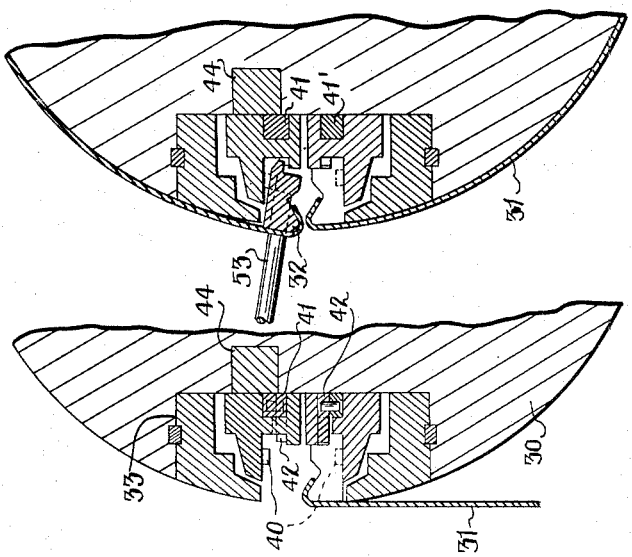
INVENTORS
THOMAS H. JOHNSON
BY ANTHONY J. MUELLER
Hudson, Boughton
Williams, David & Hoffmann
ATTORNEYS Dec. 25, 1956 T. H. JOHNSON ET AL 2,775,198
PLATE CLAMP
Filed Aug. 27, 1953 5 Sheets-Sheet 3
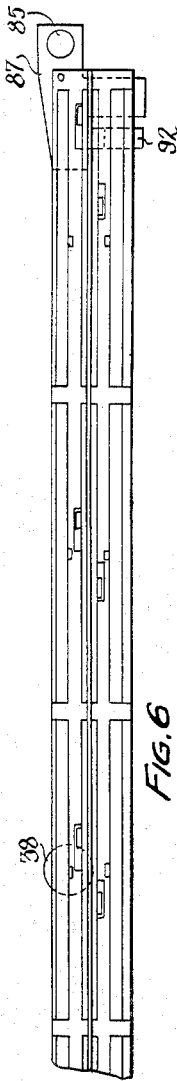
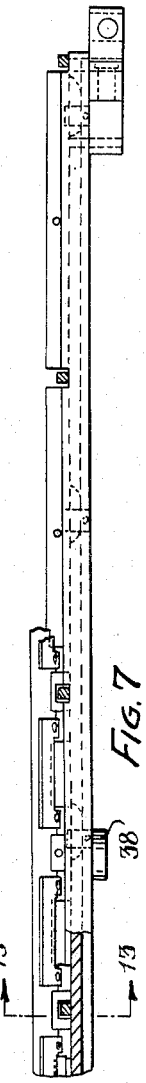
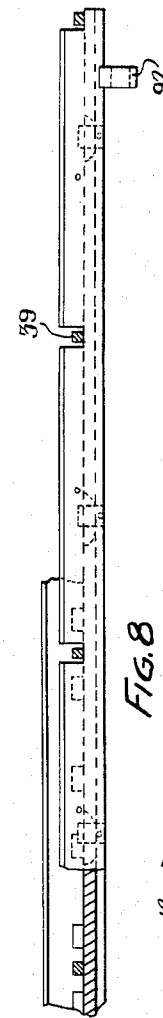
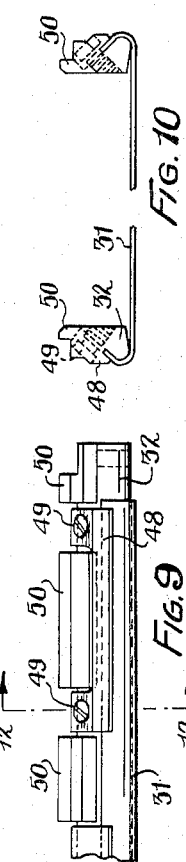
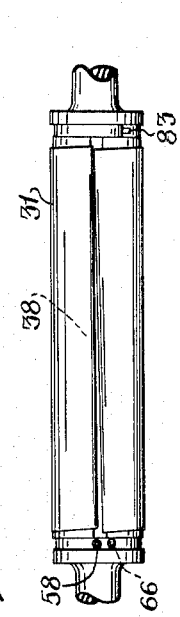
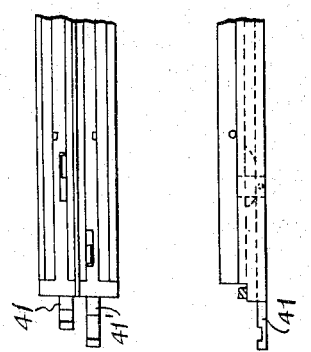
INVENTORS
THOMAS H. JOHNSON
BY ANTHONY J. MUELLER
ATTORNEYS Dec. 25, 1956

T. H. JOHNSON ET AL 2,775,198

PLATE CLAMP

Filed Aug. 27, 1953

INVENTORS
THOMAS H. JOHNSON
BY ANTHONY J. MUELLER
Hudson, Boughton,
Williams, David & Hoffmann
ATTORNEYS Dec. 25, 1956  T. H. JOHNSON ET AL  2,775,198
PLATE CLAMP
Filed Aug. 27, 1953  5 Sheets-Sheet 5

|  | POSITION 1 | POSITION 2 | POSITION 3 | POSITION 4 |
|---|---|---|---|---|
| BAR 36 | UNLOCKED | LOCKED | LOCKED | LOCKED |
| BAR 37 | UNLOCKED | UNLOCKED | LOCKED | LOCKED |

INVENTORS
THOMAS H. JOHNSON
BY ANTHONY J. MUELLER
ATTORNEYS

United States Patent Office 2,775,198
Patented Dec. 25, 1956

2,775,198

PLATE CLAMP

Thomas H. Johnson, Peninsula, and Anthony J. Mueller, Cleveland, Ohio, assignors to Harris-Seybold Company, Cleveland, Ohio, a corporation of Delaware Application August 27, 1953, Serial No. 376,800

19 Claims. (Cl. 101—415.1)

This invention relates to improvements in plate clamps, more particularly means for adjusting and securing the ends of a flexible printing plate on its cylinder for use in rotary offset or other planographic kinds of printing, and more especially for web presses where it is important to use almost the entire surface of the plate cylinder.

The image on the plate, which may be produced photographically, may not always be perfectly square with the ends and side edges of the plate, and if the plate in such cases is squared with the cylinder, the margins of the printing on the web will not be of equal breadth throughout their length. A slight skewing of the plate on the cylinder would compensate for such out-of-square image, and one of the important objects of the present invention is to provide a ready and easily operated means for thus skewing the printing plate.

Another object is the provision of pivot means mounted in the cylinder intermediate the sides of the plate at one end thereof around which the skewing of the plate may be effected.

Another object is the provision of a single actuating mechanism removably connected to both ends of the plate at one end of the cylinder for skewing the plate about its pivot and at the same time imparting relative sidewise motion to the plate ends, thereby providing a firm bearing for the plate throughout its extent.

A further object is the provision of novel means for detachably connecting the plate ends to bars that are mounted within the gap of the cylinder while those bars are spread apart and providing means controllable at one end of the cylinder for drawing the bars together to tension the plate.

Another object is the provision of means for retaining the bars against radially outward movement, along with the provision of endwise movable locking slides for locking the ends of the plate to the bars.

A further object is the provision of common means for moving both of said locking slides endwise one after the other from unlocking position to locking position.

Still another object is the provision in apparatus of the character described of spring-pressed clamps for drawing said bars toward each other and thereby tensioning the printing plate, together with means actuatable from one end of the cylinder for spreading said clamps while the plate ends are being put in place on said bars and while the said skewing adjustment is being effected.

Other objects and features of novelty will appear as we proceed with the description of that embodiment of the invention which, for the purposes of the present application we have illustrated in the accompanying drawings, in which:

Fig. 1 is a plan view of a plate cylinder embodying the invention;

Fig. 2 is a detail plan view of a rigid molding in which one end of a printing plate may be mounted;

Fig. 3 is a longitudinal sectional view taken substantially on the line 3—3 of Fig. 1;

Fig. 4 is a view on a larger scale showing spring-pressed clamp means for normally pulling the ends of the plate carrying bars together to tension the plate, and a longitudinally movable runner equipped with wedge means for spreading the said clamp means;

Fig. 5 is a plan view illustrating the means for skewing the bars in which the ends of the plate are mounted and sliding them relatively endwise;

Fig. 6 is a plan view illustrating the said bars and the locking blades for securing the moldings to the bars, the moldings being omitted for the sake of clearness;

Fig. 7 is a side elevation partly in section showing one of the locking slides in locking position;

Fig. 8 is a similar view of the other locking slide;

Fig. 9 is a fragmental detail view showing one of the clamps by which a plate is secured at each end to a rigid molding;

Fig. 10 is an end view of a printing plate with end moldings attached thereto;

Fig. 11 is a fragmental view on a larger scale illustrating particularly a common operating means for shifting the locking slides longitudinally;

Figs. 18 and 19 are detail sectional views illustrating the procedure of mounting the plate holding moldings on the supporting bars, the plate clamps being omitted for the sake of clearness;

Fig. 20 is a plan view illustrating a printing plate mounted on its cylinder in a skewed position;

Figure 12:
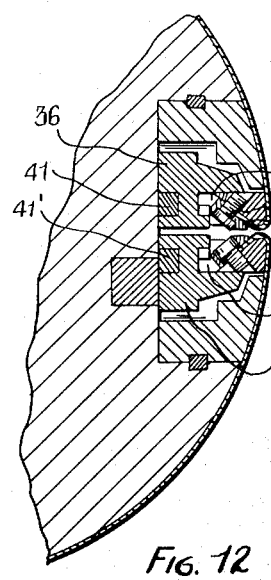
Fig. 12 is a large scale sectional view corresponding substantially to the line 12—12 of Fig. 9.
Figure 13:
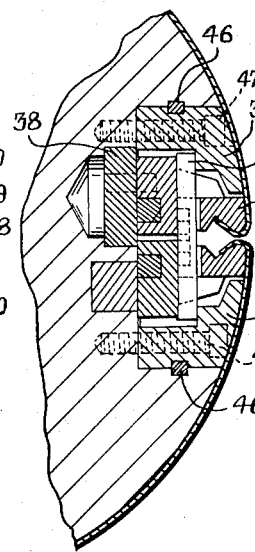
Fig. 13 is a detail sectional view on the same scale taken substantially on the line 13—13 of Fig. 7.
Figure 14:
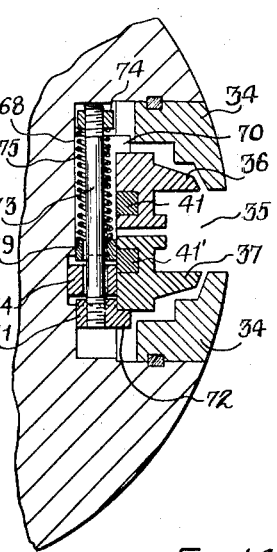
Fig. 14 is a detail sectional view taken substantially along the line 14—14 of Fig. 4.

To state a general outline of the invention, it comprises a plate cylinder 30 adapted to receive and removably hold a planographic flexible plate 31, the ends of which are clamped to rigid moldings 32. The cylinder is provided with a gap, that is a longitudinal recess 33. In this gap there are mounted semi-permanent side pieces 34 which overhang the gap to provide a relatively narrow throat 35 (Fig. 14). In the gap there are two parallel bars 36 and 37. Upon the bottom of bar 36 there is a circular disk 38 disposed midway between its ends which fits into a round hole formed in the cylinder so as to constitute a pivot for the bar. The two bars 36 and 37 are cut away at a series of spaced points along their length to receive retainers 39 (Fig. 13) against which the side pieces 34 bear. By this means the bars are held against radially outward movement but are permitted to have limited movement toward or away from each other and limited skewing movement about the pivot disk 38. The bars 36 and 37 carry several spaced pins 40 which face toward each other, and the moldings 32 have holes which receive the pins 40 when the moldings are put in place. The bars 36 and 37 each have longitudinal ways formed therein in which are mounted slides 41 and 41'. In recesses formed in these slides there are riveted locking blades 42 which, when the slides are moved to the proper positions, stand in front of the projections on the moldings disposed inwardly of the pin and hole connections and thus lock the moldings to the bars. By this means the moldings which are attached to the plate 31, are removably fastened to the bars 36 and 37 which remain always in the cylinder. The bars 36 and 37 are urged toward each other by a series of strong spring clamps 43 (Fig. 4), in order to tension the plate and cause it to hug the surface of the cylinder. The pressure of these clamps may be relieved however by a runner 44 which carries a series of wedges that are adapted to expand the spring clamps. At one end of the cylinder there is a novel mechanism for skewing bar 36 upon its pivot disk 38 and at the same time moving bar 37 lengthwise by the proper amount to maintain the plate in close contact with the cylinder surface. If the skewing of a plate becomes necessary because of a slight out-of-square position of the image thereon, the pressure of the spring clamps is first relieved and skewing adjustment then made, after which the clamps are permitted to resume their effect of drawing the ends of the plate together. The relieving of the spring clamp pressure is also necessary whenever the plate is to be removed from the cylinder and a new one put in place thereon.

Proceeding now to a more detailed description of the embodiment of the invention illustrated herein, the cylinder 30 may be provided with the usual bearers 45. Inwardly of the bearers and between them and the major part of the cylinder upon which the plate is supported, there is a space available for the mechanism by which we tension the plate and skew it when necessary. The bars 36, 37 bear against a flat surface at the bottom of the gap 33. They are held against this surface by the retainers 39. Otherwise they are free to move to a limited extent, their length being slightly less than the length of the gap and a small clearance being provided between them and the side pieces 34. These side pieces are held in place permanently after assembly by keys 46 and screws 47.

Figure 15:
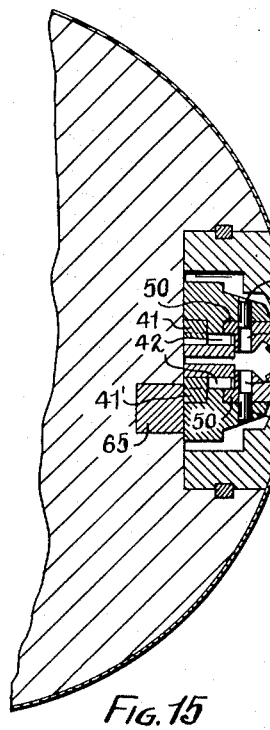
Fig. 15 is a detail sectional view taken at one of the points where the moldings for plate ends are mounted on the supporting bars by pin and hole connecting means.

The moldings 32 which are attached to the ends of the plate are preferably mounted thereon at the time the ends of the plate are bent, as indicated in Fig. 10. The plate is clamped to them by a series of clamping elements 48 which are attached to the moldings by screws 49. Constituting integral parts of each molding there are a series of inwardly extending projections or tongues 50. Bars 36 and 37 at spaced points along their length carry inwardly extending pins 40 (Fig. 15) which are adapted to be received in holes 52 formed in the moldings. When one of the moldings with a plate attached is to be put in position pin wrenches 53 are inserted into holes formed in the molding near the ends thereof, as indicated in Fig. 19, and the molding is swung around until the pins 40 are in engagement with the holes 52. The corresponding slide 41 or 41' is then moved longitudinally until the various blades 42 thereon move in front of the tongues 50 on the molding which effectively locks the molding to its bar.

Figure 22:
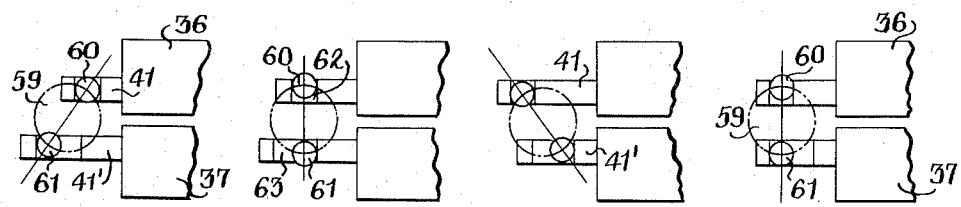
Fig. 22 is a diagram showing different positions of the locking slides.

At the left end of the cylinder these slides 41 and 41' extend into a space adjacent the bearer at that end of the cylinder, which space is covered normally by a segment 55 held in position by screws 56. Rotatably mounted in this segment there is a short shaft 57 having on its outer end a square head 58 to receive a wrench, and on its inner end within a recess formed in the segment a disk 59 carrying two diametrically opposed pins 60 and 61. Pin 60 fits within a square cavity 62 in slide 41, while pin 61 extends into an elongated cavity 63 in slide 41'. In position 1 of disk 59, as shown in Fig. 22 of the drawing, both sides 41 and 41' are in positions in which the blades 42 are withdrawn from operative position, in other words the slides 41 and 41' are in unlocked position. When the disk has been rotated counterclockwise forty-five degrees, as indicated at position 2, pin 60 has moved slide 41 lengthwise far enough to bring its blades 42 into locking position. Pin 61 however is merely moved to the other end of the rectangular cavity 63 of slide 41' and the position of that slide is unchanged. Accordingly, slide 41' remains in unlocked position. Rotation of the disk 59 counterclockwise through another forty-five degree angle to position 3 shifts slide 41 still further to the left which maintains it in locking position while pin 61 is swung to the right, pushing slide 41' to the right and into locking position. Both moldings are now secured to their bars 36 and 37. When it is desired to release the moldings from the bars the operator must turn the disk 59 clockwise through a forty-five degree angle to position 4, which incidentally leaves slide 41' unaffected and shifts slide 41 to the right somewhat but not far enough to move its blades 42 to unlocking position. However, a further rotation of the disk 59 clockwise through another forty-five degree angle will shift both slides to position 1 in which they are both in the unlocking position. Thus the operator by the manipulation of a single shaft 57 may lock first one end of the plate and then the other to the respective bars 36 and 37 and may unlock both of them simultaneously.

A groove of rectangular cross-section opening into the gap 33 constitutes the mounting for the runner 44. The latter at one end extends through the end of the cylinder and is toothed to form a rack 65 that is engaged by a pinion 66 on a short shaft 67 which is journaled in the segment 55 and is squared on its outer end to receive a wrench or crank. Intersecting the groove for runner 44 there are a series of transverse grooves 68, Fig. 14, opening into gap 33 in which are mounted the spring clamps 43 for drawing the ends of the plate toward each other. In each of these grooves on one side of runner 44 there is a U-shaped element 69 having an outwardly projecting abutment 70 that engages the outer side of bar 36. On the other side of the runner there is a nut 71 which has an outwardly projecting abutment 72 that engages the outer side of bar 37. A rod 73 is threaded on one end to threadably engage the nut 71 and on the other end to take a nut 74 which constitutes a bearing for one end of a compression spring 75 the opposite end of which bears against the transverse portion of U-shaped element 69. Rod 73 extends through a hole in U-shaped element 69 and through a slot in runner 44. It will be apparent that the parts described constitute a spring pressed clamp, the spring of which acts to push U-shaped element 69 in a direction to cause abutment 70 to urge bar 36 inwardly and to pull rod 73 and nut 71 inwardly, causing abutment 72 to push bar 37 inwardly. This condition is maintained at all times except when U-shaped element 69 and nut 71 are forced outwardly away from each other. The latter effect is obtained by moving runner 44 toward the right as viewed in Fig. 4, which causes wedge surfaces 76 on the runner to press against the element 69 and the nut 71 and force them outwardly away from each other, whereupon the clamps are expanded to relieve the clamping pressure which enables the bars 36 and 37 to be moved and adjusted. The wedging surfaces on the runner are so dimensioned that they act one at a time when the runner 44 is moved toward the right, whereby the strain on the rack and pinion is assumed gradually.

Figure 16:
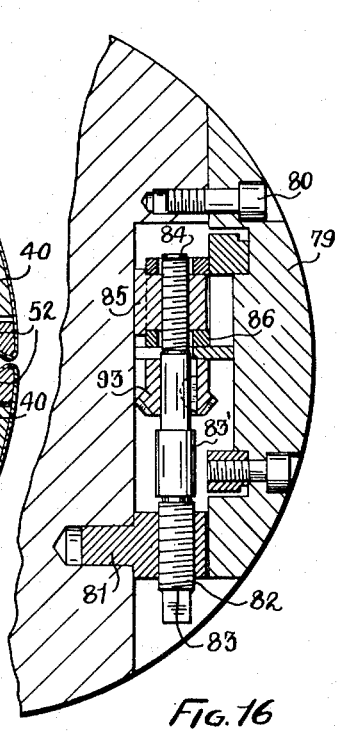
Fig. 16 is a detail sectional view taken substantially on the line 16—16 of Fig. 3.
Figure 17:
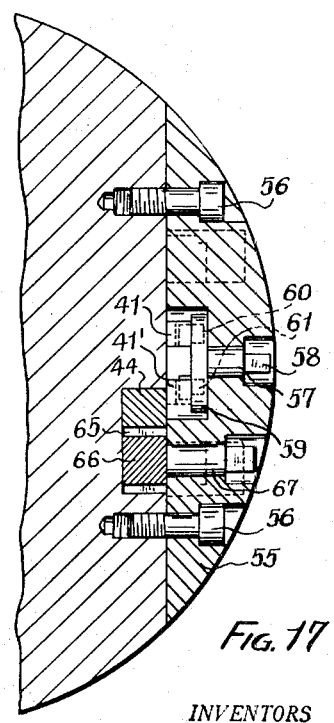
Fig. 17 is a detail sectional view taken substantially on the line 17—17 of Fig. 3.
Figure 21:
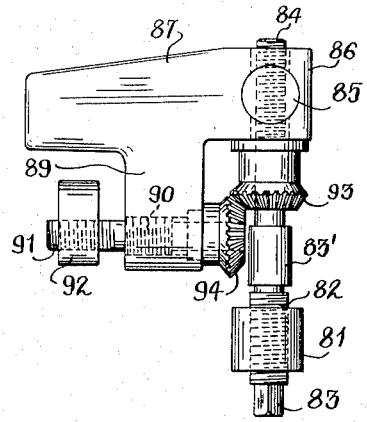
Fig. 21 is a detail plan view of a pair of differential screws operatively connected with the ends of the plate for skewing the plate and moving its ends crosswise simultaneously.

Plate skewing mechanism. This mechanism is accommodated partially in the annular space between the bearer 45 at the right hand end of the cylinder and the plate supporting part of the cylinder and partly within a recess 78 in the cylinder inwardly of the gap 33. The space next to the bearer is covered normally by a segment 79, Fig. 16, which is secured by screws 80 or the like. 81 is a post oscillatably mounted in a hole in the cylinder. It has a threaded hole therethrough to receive a screw 82 that has a squared head 83 to take a crank or wrench. At its other end the shaft 83' upon which the screw thread 82 is formed, has a screw thread 84 which extends through and is threaded in a pivot 85 that is rotatably mounted in one arm 86 of a bracket 87 that is secured to bar 36 by screws or the like 88, and has an opening therethrough providing clearance for the screw 84. A second arm 89 of the bracket has a threaded hole therethrough at right angles to shaft 83' in which is mounted a threaded portion 90 of a second screw. The latter screw has a second threaded portion 91 which is threadably mounted in a nut 92 that engages a transverse slot in bar 37. The screw 82, 84 has a bevel gear 93 keyed thereto which meshes with a bevel gear 94 on screw 90, 91, so that when screw 82, 84 is turned in one direction screw 90, 91 will turn through the same angle but in an opposite direction.

Both of these screws are differential screws. For example the threaded portion 82 may have twelve threads to the inch and the portion 84 may have fourteen threads to the inch, while the threaded portion 90 may have eighteen threads per inch and the threaded portion 91 may have fourteen threads per inch. Consequently each turn of screw 82, 84 may move pivot 85 one-twelfth inch minus one-fourteenth inch, or .0119 inch, and each turn of screw 90, 91 may move nut 92 one-fourteenth inch minus one-eighteenth inch or .0159 inch. By this means a fine adjustment may be obtained readily and the transverse adjustment of bar 37 may be caused to exactly compensate for the skewing movement about pivot 38 imparted to bar 36 by pivot 85. As previously stated the pressure of the springs in the spring clamps 43 must be relieved before the skewing adjustment can be made. The engagement of nut 92 in a transverse slot in bar 37 leaves the latter bar free to move relatively toward or away from bar 36.

While the described mechanism for skewing the plates is preferred, certain variations may be resorted to without departing from the spirit of the invention. For example, the screw 90, 91 may be omitted and the screw 83' manipulated to skew the plate. Then the free end of the plate when drawn around the cylinder will assume its natural sliding spiral position, especially when a cooperating cylinder of the press is rolled against it. The free end of the plate may then be secured by suitable means.

In accordance with the second variation the pivot 38 may be omitted while the interconnected screws 83' and 90, 91 are retained. This will make the position of the plate transversely of the cylinder somewhat uncertain, which however will present no unsurmountable obstacle since the cylinder as a whole may be made adjustable transversely of the press, as is common practice, and by this means the plate may be brought to the correct transverse position after it is secured upon the cylinder.

Having thus described our invention, we claim:

1. For a printing machine, a cylinder having a lengthwise gap therein, a flexible printing plate wrapped around said cylinder, a pair of bars within said gap secured to the respective ends of said plate, a pivot for connecting an intermediate point of one of said bars to said cylinder within said gap, means for tieing the unpivoted bar to said pivoted bar crosswise of the gap effective to prevent bodily movement of the unpivoted bar away from the pivoted bar while permitting endwise movement of the unpivoted bar, and means for skewing the pivoted bar about its pivot.

2. A cylinder as defined in claim 1, wherein said tieing means for securing the bars to each other comprises means for applying tension to the plate.

3. For a printing machine, a cylinder having a lengthwise gap therein, a flexible printing plate wrapped around said cylinder, a pair of bars within said gap secured to the respective ends of said plate, means accessible from an end of the cylinder for moving said bars endwise relative to each other, and tieing means disposed within said gap directly connecting the two bars for exerting a force drawing said bars toward each other and pulling said plate into tight engagement with the cylinder.

4. A cylinder as defined in claim 3, wherein said means for drawing said bars toward each other comprise a series of springs spaced along the length of said bars, and means actuatable from an end of the cylinder for relieving the pressure of said springs.

5. For a printing machine, a cylinder having a lengthwise gap therein, a flexible printing plate wrapped around said cylinder, a pair of bars within said gap secured to the respective ends of said plate, a pivot for connecting an intermediate point of one of said bars to said cylinder within said gap, tieing means directly connecting the two bars crosswise of said gap for securing the unpivoted bar to the pivoted bar effective to prevent bodily movement of the unpivoted bar away from the pivoted bar, and means for skewing said bars about said pivot and simultaneously moving the unpivoted bar lengthwise to adjust the plate angularly while maintaining it in close contact with the cylinder surface.

6. A cylinder as defined in claim 5, wherein the said means for skewing the bars and moving the unpivoted bar lengthwise comprises a pair of screws operatively connected together for simultaneous actuation.

7. For a printing machine, a cylinder having a lengthwise gap therein, a flexible printing plate wrapped around said cylinder, a bar secured to each of the ends of said plate, a pivot for connecting an intermediate point of one of said bars to said cylinder within said gap, means for mounting the other bar in said gap, a post in said cylinder near one end thereof, a screw threaded through said post, a bracket having two angularly disposed arms, said screw being threadably mounted in one of said arms, a second screw threaded through the other arm, a pivotal connection between said first named arm and said first screw, a nut mounted in a transverse slot in the other bar through which the second screw extends, and means for turning said screws.

8. A cylinder as defined in claim 7, characterized in that each of said screws has two threads of different pitch for engagement with threaded holes in the bracket on the one hand and with the post and nut on the other hand, whereby differential action is obtained and fine adjustment facilitated.

9. A cylinder as defined in claim 7, comprising means for operatively connecting said screws together, whereby turning force applied to one will be transmitted to the other.

10. For a printing machine, a cylinder having a lengthwise gap therein, a pair of parallel bars mounted in said gap, a plurality of retainers extending crosswise of said bars and holding them against outward movement while permitting movement toward and away from each other, a flexible printing plate wrapping around said cylinder, a rigid molding secured to each of the ends of said plate, means for removably mounting said moldings upon said bars, a pair of locking slides in said gap disposed parallel to said bars, locking blades secured to each of said slides and means at one end of the cylinder for shifting said slides to predetermined positions to lock said moldings to said bars, whereby said moldings are gripped and held against outward movement.

11. A cylinder as defined in claim 10, comprising in addition means for drawing said bars together to pull said plate tightly against the surface of the cylinder.

12. A cylinder as defined in claim 10, comprising spring pressed clamp means for drawing said bars together, a runner disposed parallel to said bars and provided with wedge surfaces for expanding said clamp means, and means for moving said runner longitudinally.

13. For a printing machine, a cylinder having a lengthwise gap therein, a pair of parallel bars in said gap, means for mounting the ends of a printing plate on said bars, a series of spring pressed clamps spaced along and directly contacting said bars for drawing the bars toward each other and tensioning said plate, a runner disposed parallel to said bars and provided with a series of wedge surfaces for expanding the several clamps, said wedge surfaces being arranged to expand the several clamps progressively one after another as the runner moves in one direction, and means for moving said runner longitudinally.

14. For a printing machine, a cylinder having a lengthwise gap therein, a pair of parallel bars mounted in said gap, a plurality of retainers extending crosswise of said bars and holding them against outward movement while permitting movement toward and away from each other, a flexible printing plate wrapped around said cylinder, a rigid molding secured to each of the ends of said plate, means for removably attaching said moldings to said bars, said bars having longitudinal ways therein, a pair of locking slides in said ways, locking blades secured to each of said slides and adapted when said slides are shifted longitudinally to predetermined positions to lock said moldings to said bars, and means at one end of the cylinder for moving said slides longitudinally.

15. A cylinder as defined in claim 14, comprising in addition means for drawing said bars together to pull said plate tightly against the surface of the cylinder.

16. In apparatus of the character described, a cylinder having a lengthwise gap therein, a pair of parallel bars in said gap, means for holding said bars against movement radially outward, a flexible printing plate wrapped around said cylinder, a rigid molding secured to each of the ends of said plate, pins carried by said bars projecting towards each other, holes in said moldings adapted to receive said pins, said bars having longitudinal ways therein, a pair of locking slides in said ways, locking blades secured to each of said slides and adapted when said slides are shifted longitudinally to predetermined positions to engage said moldings inwardly relative to the pin and hole connections, whereby said holdings are locked to said bars.

17. Apparatus as defined in claim 16, means disposed at one end of the cylinder for shifting said slides longitudinally, said means comprising a single rotary member having pins for engagement with each of said slides and movable from a position in which both slides are in unlocking position, through a position in which one slide only is in locking position to a further position in which both slides are in locking position.

18. In apparatus of the kind described, a cylinder having a lengthwise gap therein, a flexible printing plate wrapped around said cylinder, a pair of bars within said gap secured to the respective ends of said plate, a pivot for connecting an intermediate point of one of said bars to said cylinder within the gap, tieing means directly connecting the two bars for securing the unpivoted bar to the pivoted bar and means for simultaneously skewing the pivoted bar and moving said unpivoted bar longitudinally.

19. In apparatus of the kind described, a cylinder having a lengthwise gap therein, a flexible printing plate wrapped around said cylinder, a pair of bars within said gap secured to the respective ends of said plate, spring means urging said bars toward one another and means for simultaneously skewing one of said bars and moving the other of said bars longitudinally.

References Cited in the file of this patent

UNITED STATES PATENTS

| | | |
|---|---|---|
| 416,801 | Osborn et al. | Dec. 10, 1889 |
| 525,087 | Schmitt | Aug. 28, 1894 |
| 680,302 | White | Aug. 13, 1901 |
| 1,827,300 | Prichard et al. | Oct. 13, 1931 |
| 2,123,997 | Jirousek | July 19, 1938 |